United States Patent Office 3,106,459
Patented Oct. 8, 1963

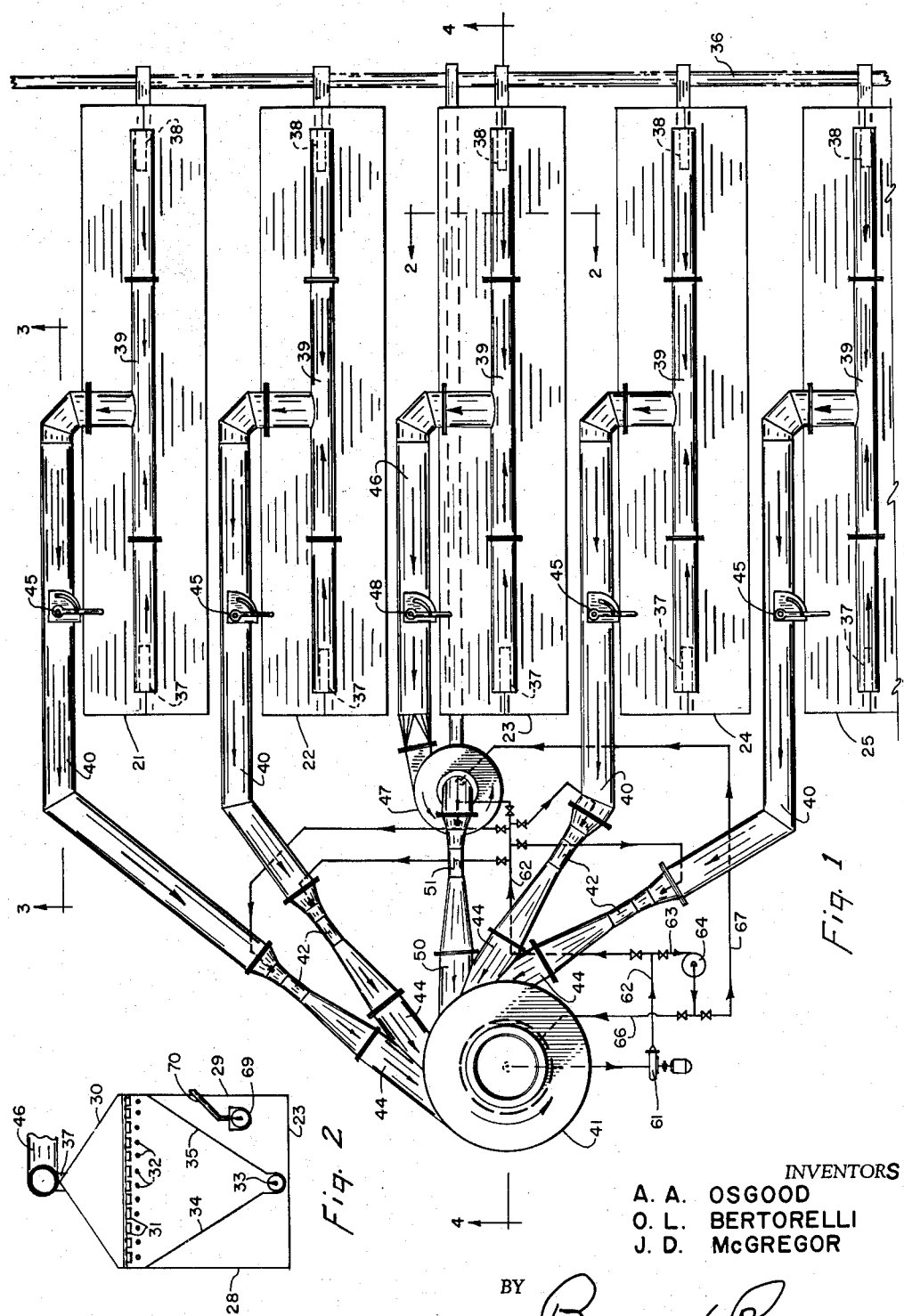

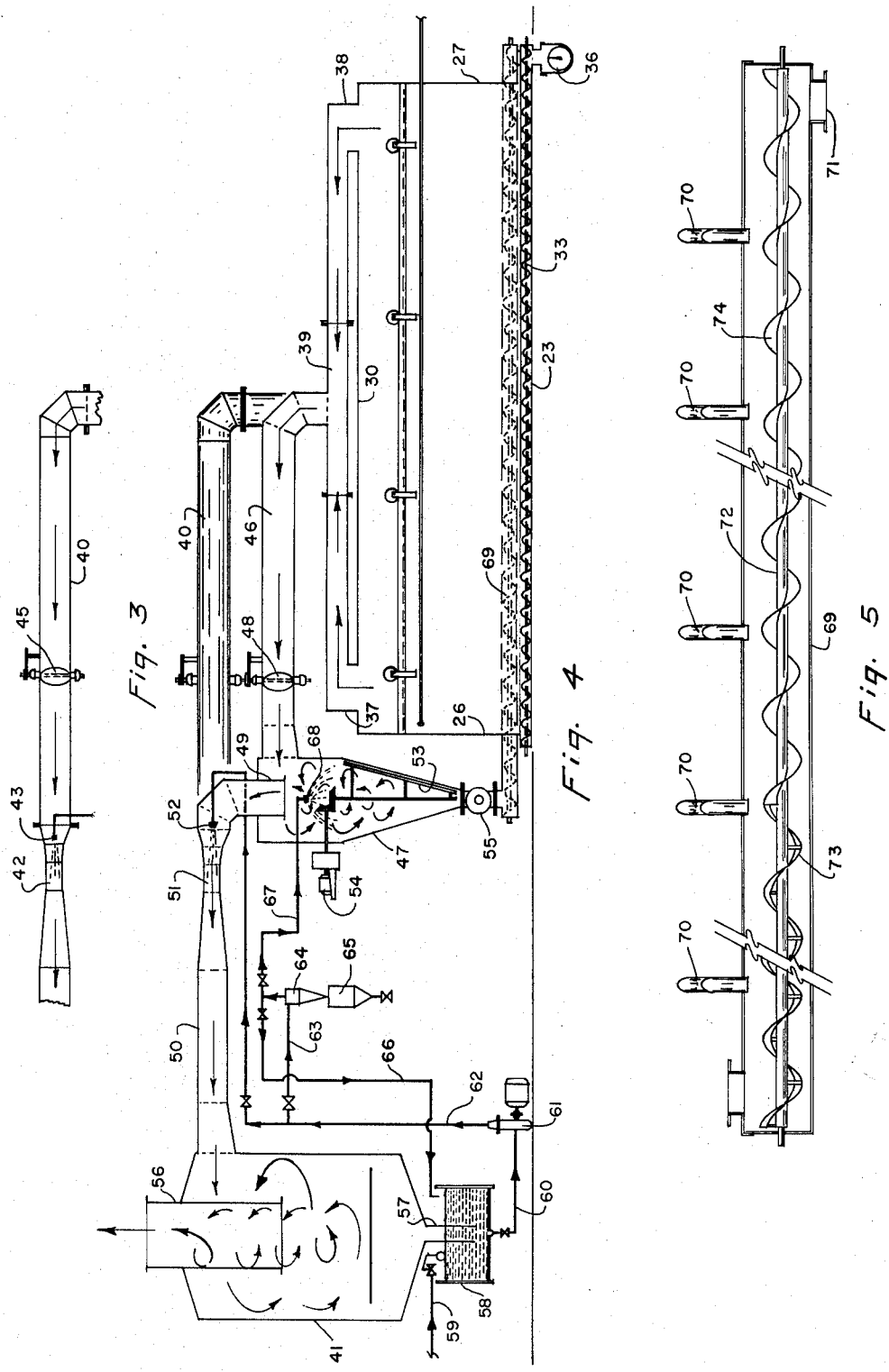

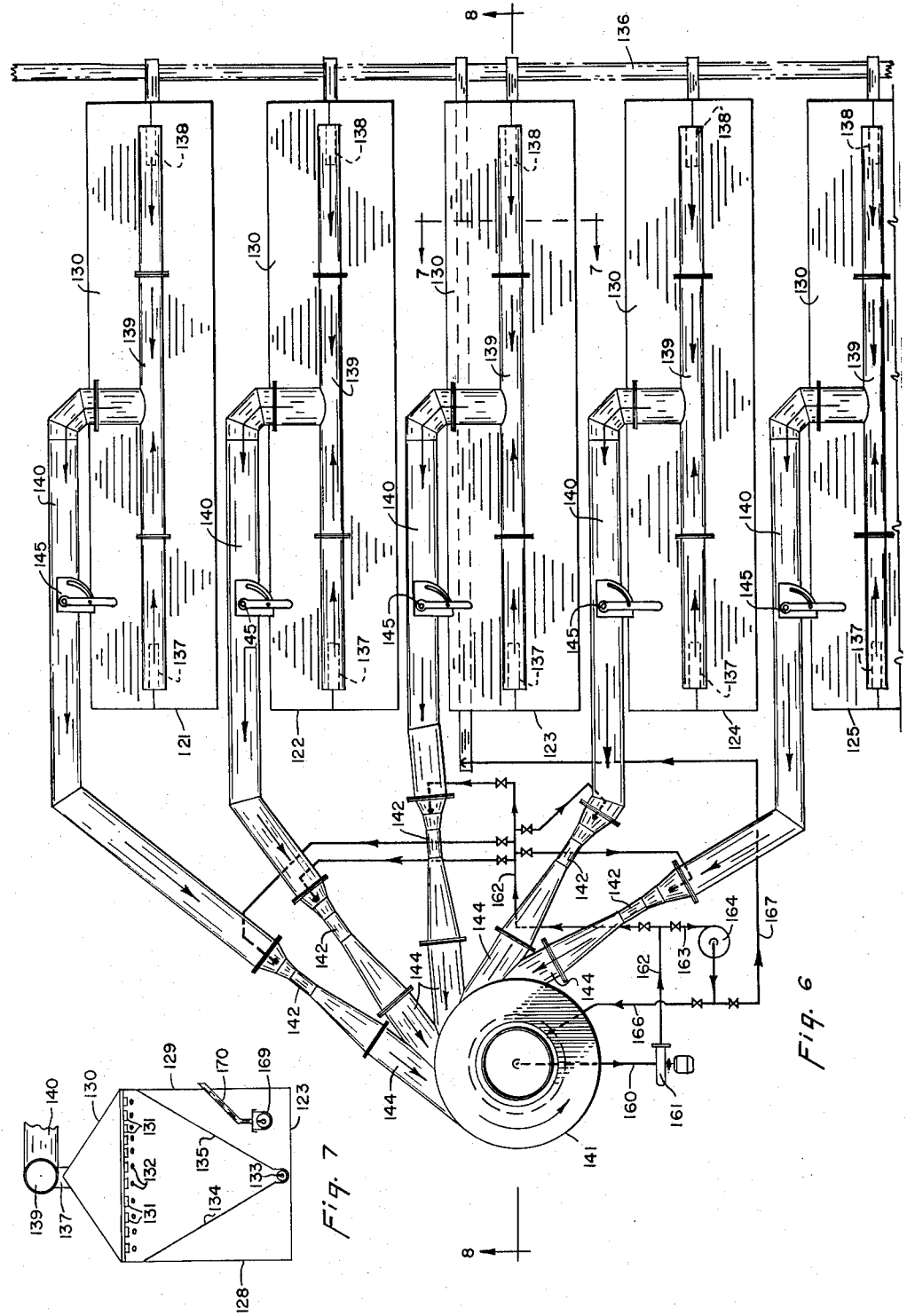

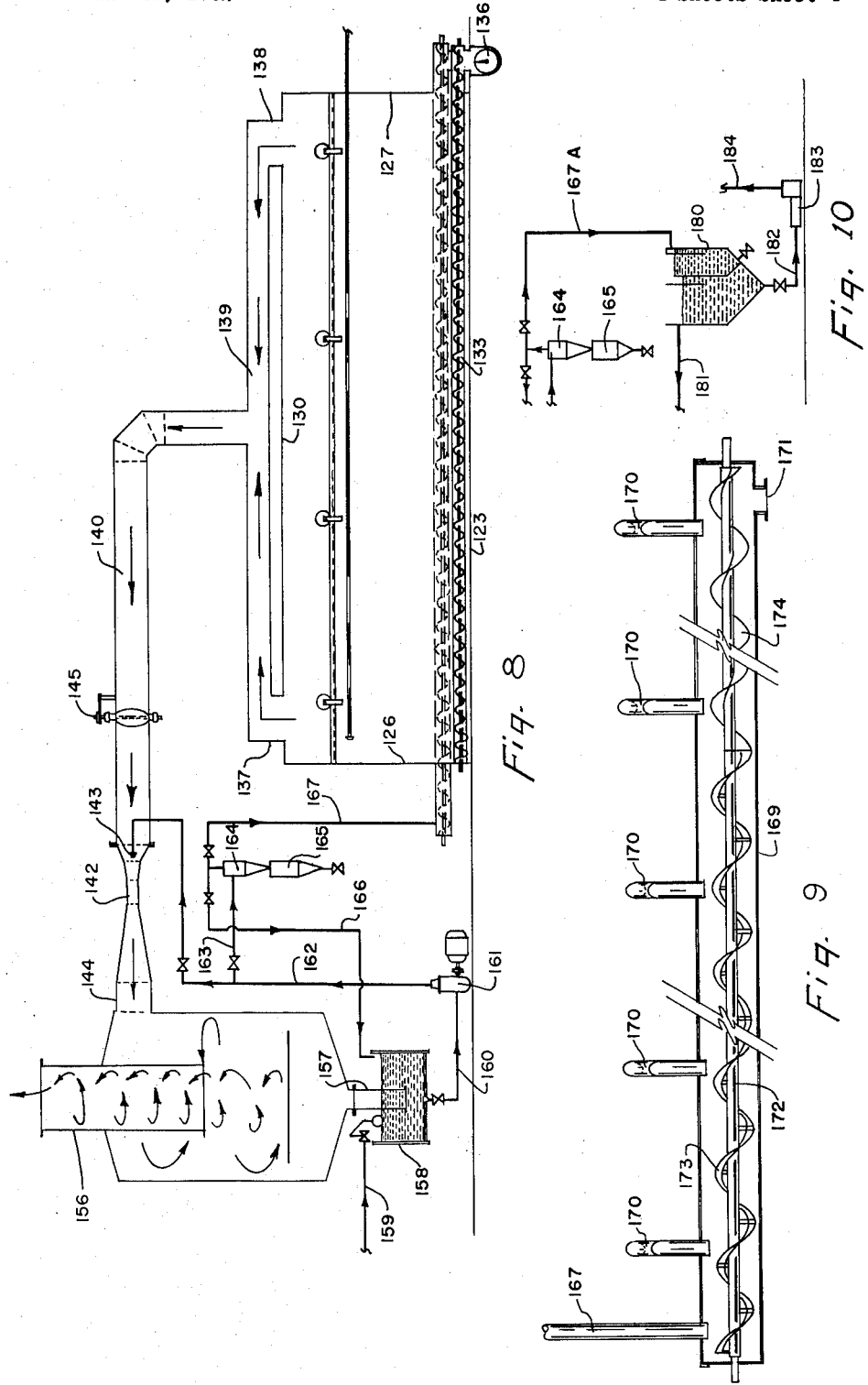

3,106,459
CARBON BLACK COLLECTION SYSTEMS
Alain A. Osgood and James D. McGregor, Borger, Tex., and Orlando Leonard Bertorelli, Havre de Grace, Md., assignors to J. M. Huber Corporation, Borger, Tex., a corporation of New Jersey
Filed Jan. 10, 1962, Ser. No. 165,402
6 Claims. (Cl. 23—259.6)

The present invention relates to a carbon black collection system and more particularly to such a system for collecting normally wasted carbon black emitted from channel houses.

In the production of carbon black in channel houses of the type illustrated generally in Patents 2,399,969 and 2,446,351, approximately one-half of the carbon black is exhausted to the atmosphere through the flues and through leaks in the walls and roof of the house. The carbon black wasted into the atmosphere not only reduces the over-all efficiency of the process but, in addition, pollutes the atmosphere, creating an unfavorable public relations problem.

The primary object of the invention is to collect the carbon black normally wasted from a channel house.

Another object of the invention is to provide a channel house carbon black collection system which will reduce the loss of carbon black through leaks in the walls and roof of the house.

A further object of the invention is to provide a wet collection system for collecting the normally wasted black from a channel house in which the heat from the channel house is utilized in drying the collected black.

A still further object of the invention is to provide a wet collection system for collecting the normally wasted black from a channel house in which a spray dryer is utilized for at least partially drying the collected black.

Other objects and advantages will become apparent in the following specification when considered in light of the attached drawings in which:

FIGURE 1 is a top plan view of the invention shown partially broken away for convenience of illustration;

FIGURE 2 is an enlarged fragmentary vertical sectional view taken on line 2—2 of FIGURE 1, looking in the direction of the arrows;

FIGURE 3 is a fragmentary sectional view taken on the line 3—3 of FIGURE 1, looking in the direction of the arrows;

FIGURE 4 is a fragmentary vertical sectional view taken on the line 4—4 of FIGURE 1, looking in the direction of the arrows;

FIGURE 5 is an enlarged fragmentary sectional view of the conveyor-dryer forming a part of the invention;

FIGURE 6 is a top plan view of a modified form of the invention;

FIGURE 7 is an enlarged fragmentary vertical sectional view taken on the line 7—7 of FIGURE 6, looking in the direction of the arrows;

FIGURE 8 is a fragmentary sectional view taken on the line 8—8 of FIGURE 6, looking in the direction of the arrows;

FIGURE 9 is an enlarged fragmentary sectional view of the conveyor-dryer forming part of the invention illustrated in FIGURE 6;

FIGURE 10 is a vertical fragmentary sectional view of another modified form of the invention.

Referring now to the drawings in detail wherein like reference characters indicate like parts throughout the several figures, the reference numeral 20 indicates generally a carbon black collection system for channel houses constructed in accordance with the invention.

The collection system 20 is adapted for use with a plurality of channel houses 21, 22, 23, 24 and 25, each of which includes opposed end walls 26, 27, opposite side walls 28, 29, and a roof 30. The channel houses 21, 22, 23, 24 and 25 are each provided with a plurality of impingement channels 31 having burners 32 positioned therebelow. A screw conveyor 33 is positioned in the lower portion of each of the channel houses 21, 22, 23, 24 and 25 and has converging walls 34, 35 associated therewith to direct collected carbon black thereto. The screw conveyor 33 empties into a transverse screw conveyor 36 extending to storage and bagging facilities (not shown).

The roof 30 is provided with a pair of flues 37 and 38 positioned at opposite ends thereof through which the combustion gases with carbon black entrained therein is normally exhausted to the atmosphere.

The structure of the channel houses 21, 22, 23, 24 and 25 described above is conventional and forms the basic construction to which the collection system 20 is attached.

An elongated manifold 39 is mounted above each of the roofs 30 centrally thereof and is connected to the flues 37 and 38 at its opposite ends. A conduit 40 extends from each of the manifolds 39 on the houses 21, 22, 24 and 25 toward a wet collector cyclone 41. A venturi 42 is formed in each of the conduits 40 and has an aspirator nozzle 43 positioned centrally of the inlet end thereof. The venturis 42 are each connected to the wet collector cyclone 41 by a conduit 44 which enters the cyclone 41 tangentially. A damper valve 45 is positioned in each of the conduits 40 between the manifold 39 and the venturi 42 to balance the flow of gases through the conduits 40.

A conduit 46 extends from the manifold 39 on the channel house 23 to the upper end of a spray dryer 47 which it enters tangentially. A damper valve 48 is positioned in the conduit 46 to control the flow of gases therethrough. The spray dryer 47 includes a gas outlet 49 extending from the upper end thereof and connected to a conduit 50 through a venturi 51. An aspirator nozzle 52 is mounted centrally of the inlet end of the venturi 51 for reasons to be assigned.

The conduit 50 extends to the upper end of the cyclone 41 which it enters tangentially.

The spray dryer 47 is provided with a revolving scraper 53, if necessary, driven by a motor 54. An air lock valve 55 is mounted on the lower end of the spray dryer 47 to permit the discharge of carbon black therefrom while preventing the escape of gas.

The wet collector cyclone 41 has a flue 56 on its upper end to permit relatively clean gas to be exhausted to the atmosphpere. The lower end of the cyclone 41 is provided with an outlet pipe 57 which extends downwardly into an open top slurry sump tank 58. The tank 58 has a float-controlled fresh water supply 59 to replace water evaporated from the system.

A pipe 60 extends from the bottom of the tank 58 to an electric motor driven pump 61 having an outlet pipe 62 extending upwardly therefrom. The pipe 62 is connected to the aspirator nozzles 43, 52 to feed slurry under pressure thereto. A pipe 63 connects the pipe 62 to a liquid cyclone 64, the underflow of which is fed to a trap 65. A part of the overflow of the cyclone 64 is fed through a pipe 66 back to the tank 58. The remainder of the overflow from the cyclone 64 is fed through a pipe 67 to a spray nozzle 68 in the spray dryer 47.

An elongated dryer-conveyor 69 extends longitudinally of the channel house 23 at the lower portion thereof and has a plurality of longitudinally spaced vents 70 extending through the side wall 29 to permit the escape of steam vapors from the dryer-conveyor 69. The dryer-conveyor 69 is connected to the air lock valve 55 at one end and has an outlet 71 on the other end to discharge carbon black into a suitable conveying system (not shown).

The dryer-conveyor 69 is provided with a screw impeller 72 having a spiral ribbon blade 73 along the first portion thereof and a solid blade 74 along the remaining portion.

In the use and operation of the structures illustrated in FIGURES 1 through 5, carbon black is produced in the channel houses 21 through 25 by burning natural gas in the burners 32 with the flames impinging on the channels 31 depositing carbon black thereon. The carbon black is scraped from the channels 31 by conventional means (not shown) and falls to the screw conveyor 33 for removal from the channel houses 21 through 25. The hot combustion gases resulting from the burners 32 pass upwardly through the flues 37, 38 out of the channel houses 21 through 25 and into the manifolds 39. The gases from the manifolds 39 of channel houses 21, 22, 24, and 25 pass through their respective conduits 40 to an aspirating venturi 42 and then through conduits 44 to a wet collecting cyclone 41. The hot combustion gases in the manifold 39 on the channel house 23 pass through the conduit 46 and into the spray dryer 47. The hot combustion gases are used in the spray dryer 47 to dry material sprayed therein in a manner described below, and the gases pass upwardly through the gas outlet 49, venturi 51, conduit 50 to the wet collector cyclone 41. The wet collector cyclone 41 separates the carbon black particles still entrained in the hot combustion gases and exhausts the cleaned gases through the flue 56 to the atmosphere. The carbon black particles pass from the wet collector cyclone 41 through the outlet pipe 57 at the bottom thereof into a slurry sump tank 58. A float-controlled fresh water supply 59 is attached to the slurry sump tank 58 to maintain a constant fluid level therein. A pipe 60 extends from the bottom of the slurry sump tank 58 to a pump 61 adjacent thereto. The pump 61 is connected by pipe 62 to the aspirator nozzles 43 and 52 positioned in the venturis 42 and 51, respectively. The slurry pumped through the nozzles 43 and 52 are effective to produce a flow of hot combustion gases through the venturis 42 and 51 to simultaneously pull gas from the channel houses 21 through 25 and force it to the wet collecting cyclone 41. The slurry pumped through the nozzles 43 and 52 and through the venturis 42 and 51 also scrubs or entrains the carbon black from the hot gases into the slurry.

A pipe 63 is connected to the pipe 62 and extends to a liquid cyclone 64 so that a portion of the output of pump 61 is directed to the liquid cyclone 64. A pipe 66 is connected to the upper portion of liquid cyclone 64 so that a portion of the overflow from the liquid cyclone 64 is fed back to the slurry sump tank 58. The underflow of liquid cyclone 64 consisting of grit, scale and other impurities is fed to the trap 65. The pipe 66 is also connected by a pipe 67 to the spray nozzle 68 of the spray dryer 47.

The hot combustion gases flowing upwardly through the flues 37, 38 of the channel houses 21 through 25 contain a considerable quantity of carbon black entrained therein; the venturis 42 and 51 of the wet collector cyclone 41 remove practically all the carbon black, from the gases, which is then discharged from the wet collector cyclone 41 as a slurry. The slurry is used to operate the aspirator venturis 42, 51 and is also fed through a liquid cyclone 64 in order to remove the foreign solids in the slurry before it is sprayed into the spray dryer 47. The heat of the combustion gases from the channel house 23 is used in the spray dryer 47 to remove water from the slurry pumped through the nozzle 68. Spray dryer 47 has a scraper 53 for preventing the caking of carbon black on the spray dryer walls, and the carbon black passes downwardly through an air lock valve 55 into a combination dryer-conveyor 69 extending through the channel house 23. The dryer-conveyor 69 has an elongated screw impeller 72 positioned therein with the impeller 72 being provided with a spiral ribbon blade 73 for a portion of its length and a solid blade 74 for the remaining portion of its length. Vents 70 extend through the wall of the channel house 23 to permit water vapors to escape therefrom. The heat of the channel house 23 serves to drive the remaining moisture from the carbon black as it passes therethrough, and the dry carbon black is discharged through the outlet 71 into either the conveyor 36 or to any suitable conveyor connected thereto.

Referring to the modification illustrated in FIGURES 6 through 9 wherein like reference characters indicate like parts throughout the several figures, the reference numeral 120 indicates generally a carbon black collection system for channel houses constructed in accordance with a modified form of the invention.

The collection system 120 is adapted for use with a plurality of channel houses 121, 122, 123, 124, 125 each of which includes opposed end walls 126, 127, opposite side walls 128, 129, and a roof 130. The channel houses 121, 122, 123, 124 and 125 are each provided with a plurality of impingement channels 121 having burners 132 positioned therebelow. A screw conveyor 133 is positioned in the lower portion of the channel houses 121, 122, 123, 124 and 125 and has converging walls 134, 135 associated therewith to direct collected carbon black thereto. The screw conveyor 133 empties into a transverse screw conveyor 136 extending to storage and bagging facilities (not shown). The roof 130 is provided with a pair of flues 137 and 138 positioned at opposite ends thereof through which the combustion gases with carbon black entrained therein normally exhausts to the atmosphere.

The structure of the channel houses 121, 122, 123, 124 and 125 described above is conventional and forms the basic construction to which the collection system 120 is attached.

An elongated manifold 139 is mounted above each of the roofs 130 centrally thereof and is connected to the flues 137 and 138 at its opposite ends. A conduit 140 extends from each of the manifolds 139 on the houses 121 through 125 toward a wet collector cyclone 141. A venturi 142 is formed in each of the conduits 140 and has an aspirator nozzle 143 positioned centrally of the inlet end thereof. The venturis 142 are each connected to the wet collector cyclone 141 by a conduit 144 which enters the cyclone 141 tangentially. A damper valve 145 is positioned in each of the conduits 140 between the manifold 139 and the venturi 142 to balance the flow of gases through conduits 140.

The wet collector cyclone 141 has a flue 156 on its upper end to permit relatively clean gas to be exhausted to the atmosphere. The lower end of the cyclone 141 is provided with an outlet pipe 157 which extends downwardly into an open top slurry sump tank 158. The tank 158 has a float-controlled fresh water supply 159 to replace water evaporated from the system.

A pipe 160 extends from the bottom of the tank 158 to an electric motor driven pump 161 having an outlet pipe 162 extending upwardly therefrom. The pipe 162 is connected to the aspirator nozzles 143 to feed slurry under pressure thereto. A pipe 163 connects the pipe 162 to a liquid cyclone 164, the underflow of which is fed to a trap 165. A portion of the overflow of cyclone 164 is fed through a pipe 166 back to the tank 158. A pipe 167 extends from the pipe 166 to the inlet end of a dryer-conveyor 169 and the remaining portion of the overflow of cyclone 164 is fed thereto.

Elongated dryer-conveyor 169 extends longitudinally of the channel house 123 at the lower portion thereof and has a plurality of longitudinally spaced vents 170 extending through the side wall 129 to permit the escape of steam vapors from the dryer-conveyor 169. The dryer-conveyor 169 is connected to the outlet pipe 167 at one end and has an outlet 171 on the other end to discharge carbon black into a suitable conveying system (not shown).

The dryer-conveyor 169 is provided with a screw impeller 172 having a spiral ribbon blade 173 along the first portion thereof and a solid blade 174 along the remaining portion.

Under some conditions of operation, it has been found that the carbon black can be dried sufficiently without the use of the spray dryer 47. In the modification illustrated in FIGURES 6 through 9, the spray dryer 47 has been eliminated and the combustion gases from the house 123 are fed directly to the wet collecting cyclone 141. With the exception of the lack of the spray dryer 47, the invention illustrated in FIGURES 6 through 9 operates and is used in exactly the same manner as the invention illustrated in FIGURES 1 through 5.

In FIGURE 10, another modified form of the invention is disclosed in which a settling tank 180 is used in the carbon black concentration system between the cyclone 164 and the dryer-conveyor 169. It should be understood that the settling tank 180 can also be used between the cyclone 64 and the spray dryer 47 if desired.

A pipe 167A feeds a portion of the overflow from cyclone 164 to the inlet of the settling tank 180. An overflow pipe 181 extends from the top of the settling tank 180 back to the sump tank 158. An outlet pipe 182 leads from the settling tank 180 to an electric motor driven pump 183. A pipe 184 leads from the pump 183 to either the dryer-conveyor 169 or to the spray dryer 47 as the case may be.

The settling tank 180 removes grit and assists in concentrating the carbon black slurry before further drying operations are carried out.

Having thus described the preferred embodiments of the invention, it should be understood that numerous additional structural modifications and adaptations may be resorted to without departing from the scope of the appended claims.

We claim:

1. A carbon black collecting system for channel black houses of the type including flues for the discharge of hot combustion gases including, entrained carbon black, comprising a wet collecting cyclone, means for conducting hot combustion gases having carbon black entrained therein from said flues to said wet collecting cyclone, said means and said wet collecting cyclone forming from said combustion gas a clean gas and a slurry with carbon black entrained therein, and a combination dryer-conveyor extending through one of said channel houses for receiving and drying the carbon black slurry from said cyclone.

2. A system as claimed in claim 1 wherein a slurry concentrating means in said system includes a spray dryer positioned between said cyclone and said combined dryer-conveyor, means connecting said spray dryer to said cyclone to feed slurry from said cyclone to said spray dryer, and means connecting said spray dryer to said dryer-conveyor to feed carbon black from said spray dryer to said dryer-conveyor.

3. A system as claimed in claim 2 wherein the hot combustion gases from at least one of said channel houses pass through said spray dryer to dry the carbon black slurry sprayed therein.

4. A system as claimed in claim 1 wherein said combined dryer-conveyor includes an elongated enclosed helical screw having a plurality of steam vents extending therefrom to the atmosphere at spaced intervals therealong.

5. A system as claimed in claim 1 wherein a slurry concentrating means in said system includes a settling tank positioned between said cyclone and said combined dryer-conveyor, means for feeding carbon black slurry from said cyclone to said settling tank and means for feeding carbon black slurry from said settling tank to said dryer-conveyor.

6. A carbon black collecting system for channel black houses of the type including flues for the discharge of hot combustion gases, comprising a wet collecting cyclone, means for conducting hot combustion gases having carbon black entrained therein from said flues to said wet collecting cyclone, means in said last-named means for entraining carbon black particles into a slurry, said wet collecting cyclone separating said slurry from the combustion gases producing a clean gas and a carbon black slurry, and a combination dryer-conveyor extending through one of said channel houses for receiving and drying the carbon black slurry from said cyclone.

References Cited in the file of this patent

UNITED STATES PATENTS

| | | |
|---|---|---|
| 1,638,722 | Barbour | Aug. 9, 1927 |
| 1,801,436 | Lewis | Apr. 21, 1931 |
| 2,835,562 | Boyer et al. | May 20, 1958 |